O. JUNGGREN.
ELASTIC FLUID TURBINE.
APPLICATION FILED MAY 9, 1919.
1,326,868.
Patented Dec. 30, 1919.
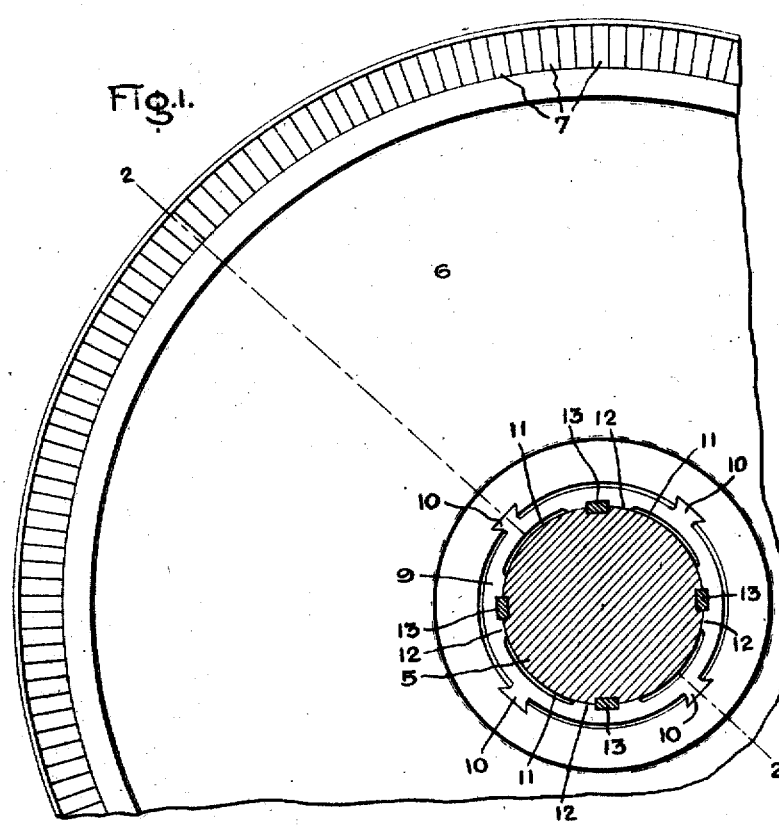
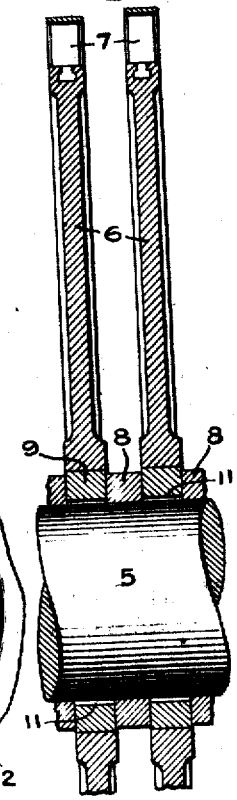
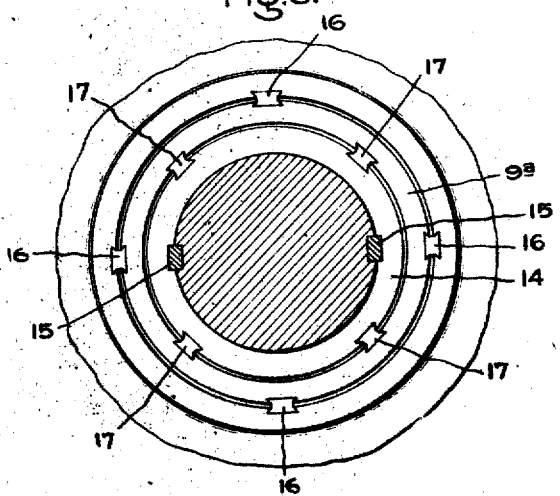
Inventor:
Oscar Junggren,
by his Attorney.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

1,326,868.

Specification of Letters Patent.   Patented Dec. 30, 1919.

Application filed May 9, 1919. Serial No. 295,854.

*To all whom it may concern:*

Be it known that I, OSCAR JUNGGREN, a citizen of the United States, residing at Schenectady, county of Schenectady, State of New York, have invented certain new and useful Improvements in Elastic-Fluid Turbines, of which the following is a specification.

The present invention relates to elastic-fluid turbines and particularly to turbines of the type comprising a plurality of disks or wheels mounted on a shaft and carrying suitable buckets upon the periphery. With such turbines it is important that the disks or wheels be made as light as possible in order to reduce the weight of the machine thereby reducing its size. In addition, by making the disks or wheels as thin as possible, particularly at the hubs where the greatest stresses occur, the distance between the bearings may be reduced, or a larger number of stages may be put in in the same distance. On the other hand, it is essential to obtain a rigid construction which will withstand not only the stresses set up due to the centrifugal action, but also those which occur due to the substantial temperature changes which are continuously going on in the turbine due to changes in load and variations in the vacuum. If the turbine wheel or disk is rigidly fastened to the shaft, these latter stresses, due to temperature changes, are very large, particularly in the hubs, on account of the wheels or disks responding much more quickly to temperature changes than the heavy shaft, and with this arrangement a relatively heavy wheel having a strong hub is required as otherwise the wheel if made too thin and light will distort and possibly loosen on the shaft.

The primary object of the present invention is to provide an improved structure in which the wheel is flexibly or yieldingly connected to the shaft so it is free to respond to temperature changes independently of the shaft. By this arrangement the strains due to temperature changes are practically eliminated and as a consequence the wheels or disks may be made much lighter and thinner than heretofore.

A further object of the invention is to provide an improved turbine wheel or disk so constructed that it has a certain amount of flexibility so that when mounted on the shaft it may expand and contract under temperature changes without being subjected to any substantial strains.

For a consideration of what I believe to be novel and my invention, attention is directed to the accompanying specification and the claims appended thereto.

In the drawing, Figure 1 is a side elevation of a portion of a turbine wheel or disk embodying my invention; Fig. 2 is a section taken on line 2—2, Fig. 1; and Fig. 3 is a detail view of a modification.

Referring to the drawing, 5 indicates a shaft and 6 wheels or disks mounted thereon and carrying the usual ring or rings of buckets 7. The wheels are spaced apart by rings 8 and it will be understood that between the wheels are the usual stationary nozzle diaphragms or intermediates for conveying elastic fluid from the buckets of one wheel to those of the next.

In carrying out my invention in accordance with the embodiment shown in Figs. 1 and 2, I provide the wheel with a bore of greater diameter than the shaft diameter and fasten in the bore a ring, the outside diameter of which is smaller than the diameter of the bore. By this means there is an annular space between the outer surface of the ring and the bore of the wheel, which space is interrupted by the holding means used. To fasten the ring in place I may use suitable keys, bolts, lugs or other means as may be found desirable. In the present instance I have shown the ring 9 provided with integral undercut projections 10 which fit into dovetailed grooves in the wheel, there being four projections 10 spaced 90° apart. The inner surface of ring 9 is cut back opposite each of the projections 10 as indicated at 11 thus forming four projections 12 having finished surfaces which engage the shaft. After ring 9 has been fastened in the bore of wheel 6 the wheel and ring are then shrunk on shaft 5, after which the ring is keyed to the shaft by keys 13. The key ways for keys 13 may be such that when the keys are driven home the projections 12 will be very slightly separated from the shaft with the result that the portion of ring 9 between the keys, *i. e.*, that adjacent projections 10 will be sprung inward slightly. Now with this arrangement in case of unequal expansion the wheel may expand independently of ring 9 and shaft 5. In doing this the sprung in portions of the ring will be pulled outward. By this arrangement the wheel may move independently of the shaft by an amount sufficient to take care of expansion and at the same time it will be held rigidly in concentric relation with the shaft and under no circumstances will it become loosened from the shaft. As is clear, the driving torque will be transmitted from the main portion of the wheel through the projections 10 to the ring 9 and thence through keys 13 to shaft 5. The ring 9 may be considered an intermediary means or member through which the wheel is connected to the shaft, or it may be considered as a part of the wheel, according to the aspect from which the structure is viewed.

In Fig. 3 I have shown a modified arrangement in which a ring 9ª which corresponds to ring 9 in Fig. 1, instead of being keyed directly to the shaft is fastened in spaced relation to a second ring 14 which is shrunk on the shaft and keyed by means of keys 15. Rings 9ª and 14 thus form an intermediary means through which a wheel is fastened to the shaft or viewed from another aspect they may be considered a part of the wheel. Ring 9ª is fastened in the bore of the wheel by keys 16 and ring 9ª is fastened to ring 14 by means of keys 17, the keys 16 and 17 being arranged in staggered relation to each other. In the present instance there are four keys 16 and four keys 17, spaced 90° apart but it will be understood that any other suitable arrangement may be used. The arrangement shown in Fig. 3 permits expansion of the wheel independently of the shaft in the manner already referred to in connection with Figs. 1 and 2, but owing to the interposition of the second ring the arrangement will give greater flexibility.

It is to be noted in connection with each of the arrangements shown that the wheel is maintained rigidly in concentric relation to the shaft so far as centrifugal forces are concerned and that it can not shift as a whole to change its center of rotation. In other words, the center of the wheel is rigidly fixed as regards the axis of the shaft and it cannot move sidewise bodily in its own plane. However, the wheel can expand radially relatively to the shaft to take care of unequal expansion due to temperature changes.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a shaft, a wheel having a bore of greater diameter than the shaft, and ring means located in the bore of the wheel through which the wheel is connected to the shaft, said ring means being rigidly fixed at spaced intervals to the wheel and shaft whereby the wheel cannot change its center of rotation but may expand radially relatively to the shaft.

2. In combination, a shaft, a wheel, and a ring having internal and external projections arranged in staggered relation to each other, said internal projections being fixed to the shaft and said external projections being fixed to the bore of the wheel.

3. In combination, a shaft, a wheel, and a ring interposed in the bore of the wheel between the wheel and the shaft, said ring being fixed to the wheel and shaft at spaced intervals staggered in relation to each other.

4. In combination, a shaft, a wheel, a ring fixed to the shaft and engaging it at spaced intervals, and a wheel fixed to said ring at points between said intervals whereby the wheel cannot change its center of rotation but may expand and contract relatively to the shaft.

5. In combination, a wheel, a shaft, said wheel having a bore of greater diameter than the shaft diameter, a ring located in the bore of the wheel, said ring having an external diameter less than that of the bore of the wheel and an internal diameter greater than that of the shaft, and means staggered relatively to each other for fixing the ring to the wheel and the shaft.

In witness whereof I have hereunto set my hand this 8th day of May, 1919.

OSCAR JUNGGREN.